US005635658A

United States Patent [19]

Kondo et al.

[11] Patent Number: 5,635,658

[45] Date of Patent: Jun. 3, 1997

[54] SOUND CONTROL SYSTEM FOR CONTROLLING AN EFFECT, TONE VOLUME AND/OR TONE COLOR

[75] Inventors: Masao Kondo; Yoshihiro Shiiya, both of Hamamatsu, Japan

[73] Assignee: Yamaha Corporation, Japan

[21] Appl. No.: 250,462

[22] Filed: May 27, 1994

[30] Foreign Application Priority Data

Jun. 1, 1993 [JP] Japan .................................... 5-156031
Jun. 30, 1993 [JP] Japan .................................... 5-186911

[51] Int. Cl.$^{6}$ ................................ G01P 3/00; G10H 1/02

[52] U.S. Cl. ................................ 84/626; 84/633; 84/662; 84/665

[58] Field of Search .............................. 84/622, 626, 633, 84/659, 662, 665; 381/63, 119

[56] References Cited

U.S. PATENT DOCUMENTS

| | | | |
|---|---|---|---|
| 4,479,240 | 10/1984 | McKinley, Jr. | 381/119 |
| 4,791,847 | 12/1988 | Nishimoto | 84/622 |
| 4,915,007 | 4/1990 | Wachi et al. | 84/622 |
| 5,054,077 | 10/1991 | Suzuki | 381/119 |
| 5,060,272 | 10/1991 | Suzuki | 381/119 |
| 5,081,898 | 1/1992 | Fujimori | 84/622 |
| 5,185,492 | 2/1993 | Ikeya | 84/622 |
| 5,260,508 | 11/1993 | Bruti et al. | 84/622 |
| 5,288,941 | 2/1994 | Sekizuka | 84/626 |
| 5,412,154 | 5/1995 | Takeda et al. | 84/622 |

*Primary Examiner*—William M. Shoop, Jr.
*Assistant Examiner*—Jeffrey W. Donels
*Attorney, Agent, or Firm*—Graham & James LLP

[57] ABSTRACT

A data set including data representing volume levels of an original sound and of an effect-imparted sound that has been set by a first musical instrument is transmitted to a second musical instrument. If any effect corresponding to the transmitted effect volume level data is not achievable by the second musical instrument, the second musical instrument modifies the original sound volume level in accordance with the effect volume level data, to thereby control a total volume balance. When tone color designating information is transmitted from the first instrument to the second instrument and tone color designated by the information is achieved by the second instrument, data representing a tone color group having been achieved by the second instrument is stored. Then, when any tone color group not achievable by the second instrument is designated, the designated tone color group is replaced with the stored tone color group.

15 Claims, 9 Drawing Sheets

SOUND CONTROL SYSTEM FOR CONTROLLING AN EFFECT, TONE VOLUME AND/OR TONE COLOR

BACKGROUND OF THE INVENTION

The present invention relates to a technique which is advantageously applicable to electronic musical instruments that are capable of receiving various data via MIDI (Musical Instrument Digital Interface), for example, so as to perform a variety of music performance setting operations such as effect imparting operations.

In the field of electronic musical instruments, there has been commonly known a technique of imparting tone signals various musical effects such as reverberation and tremolo, to provide effect-imparted synthesized tones. For instance, Japanese Patent Laid-open Publication No. HEI 3-126091 discloses an effect imparting device in which a tone signal derived from imparting an effect to an original sound (so-called "dry" sound) signal is multiplied by a predetermined level value and then the multiplied tone signal is mixed with the original sound signal to provide ultimate output tone signal for audible reproduction. With the disclosed device, it is possible to control the degree or depth of the effect by only adjusting the level value to be multiplied with the effect-imparted tone signal.

There have also been known devices comprising a plurality of effect imparting circuits, in which an original sound signal is input to the individual effect imparting circuits for impartment of respective effects and then output signals from the effect imparting circuits are mixed with the original sound signal to provide ultimate output tone signal. This device controls the level of the original sound signal as well as the level of the input or output signal to or from each of the effect imparting circuits and mixes the thus level-controlled signals together so as to provide ultimate output tone signal. The effect balance is determined by the degree in which the levels of the original sound signal and of the signals input to or output from the effect imparting circuits are controlled.

It may sometimes be desired that data such as effect balance data prepared in one electronic musical instrument having a plurality of effect imparting circuits (first electronic musical instrument) be utilized in another electronic musical instrument (second electronic musical instrument). In such a case, no significant problem will arise, provided that the first and second electronic musical instruments have the same effect imparting circuits. However, it is very probable that the second electronic musical instrument does not contain one or more particular effect imparting circuits which are provided in the first electronic musical instrument. In such a case, there will arise a problem that output tone volume will undesirably decrease to an appreciable degree, due to the fact that the effect balance data is prepared in the first instrument on the presumption that the particular specific effect imparting circuits are provided is utilized in the second electronic musical instrument without such particular effect imparting circuits. For example, in such a case where effect balance data is prepared in one electronic musical instrument that is designed to halve the level of original sound signal and also the level of signal obtained by imparting reverberation to the original sound signal and then mix the thus level-controlled signals to provide output tone signal, and where the effect balance data is directly utilized in another electronic musical instrument having no reverberation circuit, the other electronic musical instrument will of course be unable to impart a reverberation effect due to lack of reverberation circuit, and yet, output tone volume will appreciably decrease due to the halved level of the original sound signal.

Among the conventional electronic musical instruments, such musical instruments have been known which can set only sensitivity of modulation such as vibrato, but no musical instrument ever developed can set a minimum modulation depth of vibrato or the like. Ordinarily, the conventional electronic musical instruments are designed to allow various settings to be made as desired by the user and operate on the basis of the thus-made settings. Some of these electronic musical instruments are responsive to specific instructions to restore, i.e., initialize the settings to predetermined original states. But, in the prior art electronic musical instruments, all the settings are collectively restored to the corresponding original states, and it is not at all possible to cause only selected information not to be initialized.

Japanese Patent Laid-open Publication No. SHO 59-197090 discloses an electronic musical instrument which employs a technique of converting tone control information received from outside, into tone control data for controlling various characteristics of tones to be generated by its tone generation means. According to the disclosed technique, when the electronic musical instrument has received information on a particular tone color that can not be sounded or achieved by the instrument, some alternative tone color is sounded in place of the received tone color. But, in fact, among various tone colors used in the musical instruments, some tone colors may be appropriately replaceable with other tone colors and others may not be appropriately replaceable. However, the prior technique disclosed in the aforementioned publication never considers this because it is designed to collectively replace all tone colors.

In order to share music piece data among plural electronic musical instruments of different models, it is desirable that tone colors common to all the instruments be allotted to specific tone color numbers. However, since each of the instruments has its unique tone generation system and performance, it may have some tone colors unique or peculiar to the instrument. Further, for tone colors common to the plural instruments as well, some of the instruments, particularly if they are of a high-grade, sophisticated model, may have plural sets of variations of the common tone colors. If music piece data of a high-grade model are to be reproduced using a lower-grade model with less tone colors, there may not be corresponding tone color numbers in the lower-grade model, but no significant problem will result even when the missing tone color is replaced with a corresponding variation. But, as for tone color unique to the high-grade model, tone color replacement may often yield entirely different tone, thus hindering appropriate reproduction of the music piece data. Further, as for the replacement with variation tone color, since tone color variations possessed by, i.e., provided in the individual instruments are not known, simple tone color replacement procedures may always result in replacement with a same variation tone color.

SUMMARY OF THE INVENTION

It is therefore an object of the present invention to provide an effect imparting system which, even when it utilizes data representative of effect balance or the like prepared by another electronic musical instrument or the like, is capable of appropriately imparting musical effect without causing an undesirable decrease in tone volume.

It is another object of the present invention to provide an electronic musical instrument which is capable of setting not only sensitivity but also a minimum depth of modulation such as vibrato.

It is still another object of the present invention to provide an electronic musical instrument which, when restoring various settings of the device to predetermined original states, allows only selected information not to be restored to a corresponding original state.

It is still another object of the present invention to provide an electronic musical instrument which is capable of achieving natural tone color replacement by replacing only tone color of a common tone color group that can be designated in a manner common to different models of musical instruments and selecting to-be-replaced tone color in consideration of a past replacement history.

In order to achieve the above-mentioned objects, an effect imparting system in accordance with the present invention comprises an effect imparting section for imparting an input original sound signal one or more specific kinds of effects forming a first effect group, the effects being imparted independently of each other, a synthesis section for synthesizing the original sound signal and signal having been imparted respective effects by said effect imparting section, a first setting section for setting a volume level of the original sound signal, a second setting section for setting respective volume levels of one or more effects that are selected from among the first effect group and from among a second effect group formed of one or more effects other than those of the first effect group, a determination section for determining which of the first and second effect groups each of the selected one or more effects having the volume level set by the second setting section belongs to, a modification section for modifying the volume level of the original sound signal set by the first setting section, in accordance with the volume level, set by the second setting section, of the effect determined by the determination section as belonging to the second effect group, and a section for controlling respective levels of the signals to be synthesized by the synthesis section, in accordance with the volume level, set by the second setting section, of the effect determined as belonging to the first effect group set and the volume level modified by the modification section.

An effect imparting device in accordance with another aspect of the present invention comprises an effect imparting section for imparting an input original sound signal one or more specific kinds of effects forming a first effect group, the effect imparting section being provided for each of the effects to impart the effects independently of each other, an input section for inputting original sound level data for controlling a volume level of the original sound signal and individual effect level data for setting respective volume levels of the effects of the first effect group and a second effect group formed of one or more effects other than those of the first effect group, a determination section for determining which of the first and second effect groups the individual effect level data input through the input section correspond to, a section for, in accordance with the individual effect level data determined by the determination section as corresponding to the effect of the first effect group, controlling volume levels of effect-imparted signals output from the effect imparting section for imparting corresponding effects, a section for, in accordance with the individual effect level data determined as corresponding to the effect of the second effect group, modifying the original sound level data input through the input section and controlling the volume level of the original sound signal in accordance with the modified original sound level data, and a synthesis section for synthesizing the effect-imparted signals and the original sound signal which have been controlled in respective volume levels.

A sound effect controlling method of the present invention comprises a step of transmitting a data set from a first musical instrument to a second musical instrument, the data set comprising original sound volume setting data for setting a volume level of an original sound and effect sound volume setting data for setting a volume level of an effect-imparted sound for one or more effects, a step of, if the effects corresponding to the effect sound volume level setting data transmitted to the second musical instrument are not achievable by the second musical instrument, modifying the original sound volume level data in accordance with the effect sound volume setting data, to thereby control a total volume balance, and a step of, when the second musical instrument is to impart some effect to a given sound signal, controlling a volume level of an effect-imparted signal by the transmitted effect sound volume level setting data, controlling a volume level of the original sound by the modified original sound volume setting data, and synthesizing the thus controlled effect-imparted signal and original sound signal for audible reproduction.

In accordance with the present invention, it is possible to set volume level to the respective effect imparting sections, irrespective of whether all the effect imparting sections are provided in the musical instrument in question. Of course, a volume setting operation is effective with respect to such effect imparting sections provided in the instrument, but a volume setting operation with respect to such effect imparting sections missing (not provided) in the instrument is ineffective. However, according to the present invention, volume level of an original sound is modified on the basis of the volume level set for the missing effect imparting sections.

Thus, even in a case where effect balance data prepared in another electronic musical instrument (data including volume level setting data for the missing effect imparting sections), the original sound volume level is modified in the abovementioned manner. This permits appropriate effect impartment without causing an unwanted decrease in output tone volume.

A sound control system in accordance with still another aspect of the invention comprises a tone color designation section for designating tone color of a sound to be generated, a modulation control parameter supplying section for supplying a modulation control parameter relating to a predetermined modulation effect, in correspondence to the tone color designated by the tone color designation section, the modulation control parameter having a value peculiar to the designated tone color, an input section for receiving modulation setting information relating to the predetermined modulation effect, a modification section for modifying the modulation setting information received through the input section, in accordance with the modulation control parameter supplied by the modulation control parameter supplying section, and a section for imparting the predetermined modulation effect to the sound in accordance with the modulation control parameter modified by the modification section.

A sound control system in accordance with still another aspect of the present invention comprises a storage section for storing respective settings of various information relating to sound generation and control, a sound signal to be generated being controlled on the basis of the settings of the various information stored in the storage means, a modification section for modifying, as desired, the respective settings stored in the storage section, an initialization section for, in response to a user's instruction, collectively restoring the settings of the various information to predetermined initial states, and an inhibition section for, when the various information is restored to the predetermined initial states by the initialization section, selectively inhibiting predetermined information of the various information from being restored.

A sound control system in accordance with yet another aspect of the present invention comprises an independent musical instrument capable of achieving tone colors of a common tone color group that can be designated in a manner common to a different musical instrument and tone colors of a unique tone color group that are designated in a manner peculiar to the independent musical instrument, the common tone color group including at least one tone color group. The independent musical instrument comprises a reception section for receiving, from outside the system, information specifying a combination of a tone color group and an individual tone color contained in the tone color group so as to designate a specific tone color, a replacement section for, if the tone color of the tone color group designated by the information received by the reception section is not achievable by the independent musical instrument, replacing the designated tone color with any tone color of the common tone color group as long as the designated tone color belongs to the common tone color group.

With the arrangement described above, it is possible to set not only sensitivity but also a minimum depth of modulation such as vibrato. Further, when initializing settings of an electronic musical instrument, it is possible not to initialize only selected information such as master tuning information. Moreover, in a musical instrument which has a tone color group common to another instrument and a tone color group peculiar to the musical instrument, as well as variations in the common tone color group, when designation of a tone color group has been received from outside, and even if the designated tone color group is not present in the instrument, it is possible to achieve a tone color similar to the designated tone color by replacing the designated tone color group with a tone color group having been confirmed in the past as achievable by the instrument, as long as the designated tone color is the common tone color group.

Now, the preferred embodiment of the present invention will be described in detail below with reference to the accompanying drawings.

DETAILED DESCRIPTION OF THE PREFERRED EMBODIMENT

Figure 1:
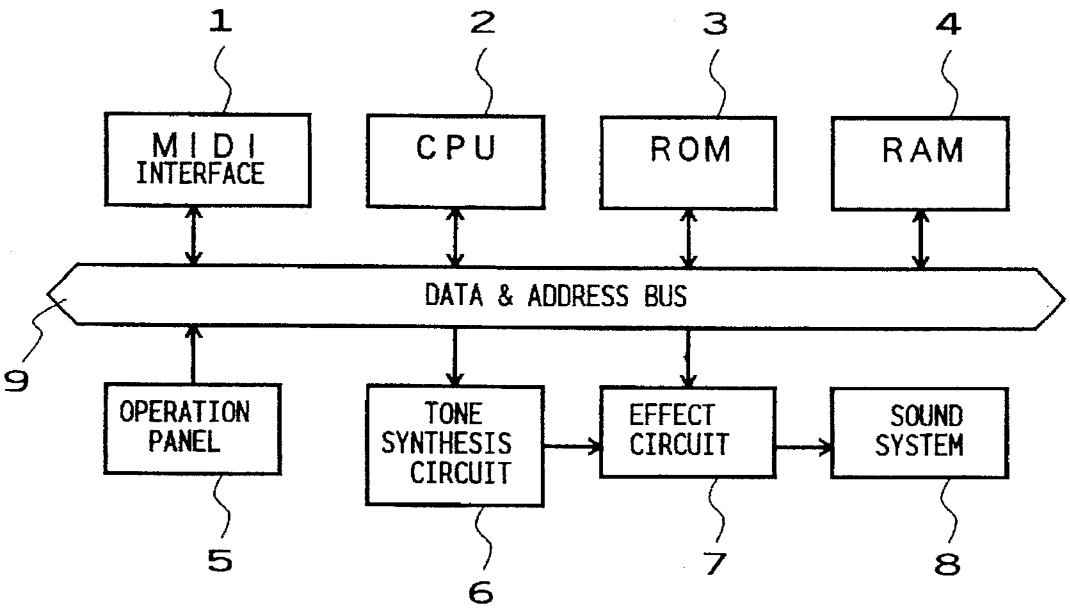
FIG. 1 is a block diagram illustrating the general hardware structure of an electronic musical instrument employing an effect imparting device in accordance with an embodiment of the present invention.

FIG. 1 is a block diagram illustrating the general hardware structure of an electronic musical instrument in accordance with an embodiment of the present invention. As illustrated, the electronic musical instrument generally comprises a MIDI interface 1, a CPU (Central Processing Unit) 2, a ROM (Read-only Memory) 3, a RAM (Random Access Memory) 4, an operation panel 5, a tone synthesis circuit 6, effect circuitry 7, a sound system 8 and a data and address bus 9.

The MIDI interface 1 is provided for transmitting and receiving various performance information to and from an external MIDI instrument in accordance with the MIDI protocol. The CPU 1 controls the entire operation of the electronic musical instrument of the embodiment. In the ROM 3 are stored programs to be executed by the CPU 1, various control data etc. The RAM 4 contains various working areas such as registers and flags. The operation panel 5 includes various operating members for the user's manual operation. The tone synthesis circuit 6 generates tone signals on the basis of instructions given from the CPU 2. The effect circuitry 7 receives, as original sound signals, tone signals output from the tone synthesis circuit 6 and imparts various effects to the received tone signals. The sound system 8 sounds tones in accordance with the effect-imparted tone signals provided from the effect circuitry 7. The data and address bus 9 is a bidirectional bus interconnecting the above-mentioned components.

Figure 2:
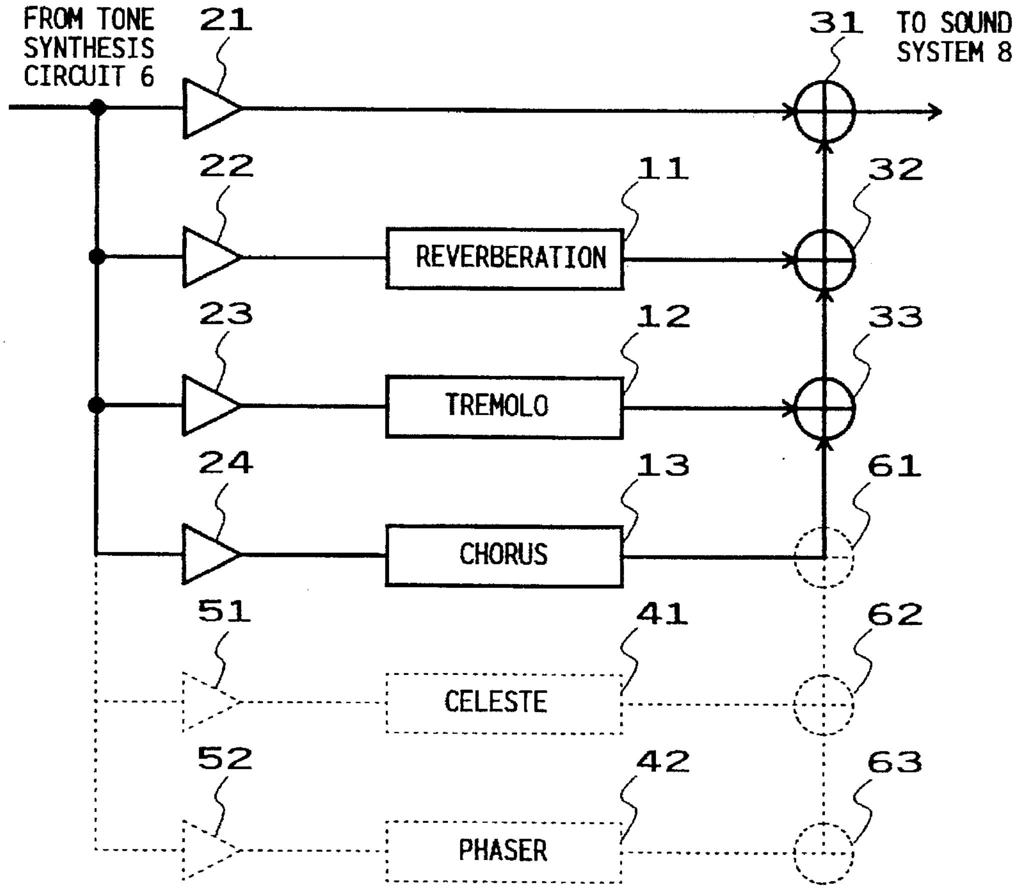
FIG. 2 is a block diagram illustrating an example of effect circuitry contained in the device of FIG. 1.

FIG. 2 is a block diagram illustrating the detailed structure of the effect circuitry 7, which, according to the embodiment, is comprised of a reverberation circuit 11, a tremolo circuit 12, a chorus circuit 13, multipliers 21 to 24 and adders 31 to 33. The effect circuitry 7, according to the embodiment, is provided independently for each MIDI channel, but the circuitry 7 may be time-divisionally shared among the MIDI channels. The original sound signal from the tone synthesis circuit 6 is given to the four multipliers 21 to where the sound signal is multiplied by respective predetermined multipliers (which, for convenience, will be referred to as "multiplier numbers" to differentiate from the multipliers 21 to 24). The multiplier 21 is for adjusting the volume level of the original sound (dry sound) signal which is subsequently imparted no effect. The multiplier 22 is for adjusting the volume level of the sound signal to which a reverberation effect is subsequently imparted by the reverberation circuit 11 to provide a reverberation-effect tone, and the multiplier 23 is for adjusting the volume level of the sound signal to which a tremolo effect is subsequently imparted by the tremolo circuit 12 to provide a tremolo-effect tone. The multiplier 24 is for adjusting the volume level of the sound signal to which a chorus effect is subsequently imparted by the chorus circuit 13 to provide a chorus-effect tone. The dry sound signal directly from the multiplier 21 and the effect-imparted tone signals from the reverberation circuit 11, tremolo circuit 12 and chorus circuit 13 are added or mixed together through the adders 31 to 33 and are output to the sound system 8 as ultimate effect-imparted tone signal for audible reproduction.

Next, the operation of the electronic musical instrument according to the embodiment will be outlined with reference to FIGS. 3 to 13.

The electronic musical instrument receives performance information from outside by way of the MIDI interface 1. The received performance information is stored into a predetermined MIDI buffer memory. The CPU 2 scans through the MIDI buffer memory to determine whether there is any data stored therein. If some data is stored in the buffer memory, the CPU 2 performs processing as dictated by the stored data. For example, when note data (i.e., performance data including tone pitch data, key-on/key-off data etc.) have been received by the electronic musical instrument, the CPU 2 writes the note data into a note buffer memory and then instructs the tone synthesis circuit 6 to generate a tone signal corresponding to the note data. The tone synthesis circuit 6 generates such a tone signal in accordance with the instructions from the CPU 2. The above-mentioned multiplier numbers used in the multipliers 21 to 24, i.e., volume levels of the dry sound signal and effect tone signals are also dependent on effect data received from outside. More specifically, when effect data have been received from outside, the CPU 2 sets the volume levels of the dry sound signal and effect tone signal in the effect circuitry 7, in accordance with the received effect data.

Among the effect data provided from outside, there may be some data relating to effect for which the electronic musical instrument contains no necessary effect imparting circuit. For example, there may be a case where the effect data are prepared by another electronic musical instrument which, in addition to the above-mentioned effect imparting circuits 11 to 13, multipliers 21 to 24 and adders 31 to 33, includes further effect imparting circuits such as a celeste circuit 41 and a phaser circuit 42, multipliers 51, 52 and adders 61, 62, 63. In such a case, the effect data may contain data for setting (adjusting) the volume levels of celeste and phaser effect tones, and the volume level of the dry sound may be set on the assumption that celeste or phaser effect tone will be output.

Thus, if the electronic musical instrument provided with no celeste circuit 41 and phaser circuit 42 sets the volume levels of the dry sound and effect tones in the effect circuitry 7, using the effect data directly as received (i.e., effect data containing the volume level setting data for celeste and phaser effects), the volume level of the dry sound will become small so that the effect balance as a whole will collapse. So, the electronic musical instrument according to the embodiment is designed to set the volume levels in a manner described below, so as to achieve an appropriate effect balance even when the instrument has received effect data containing volume level setting data for celeste and phaser effects that can not be achieved the instrument.

(1) In the case where "BnH+5AH+Vd" has been received as effect data:

"BnH" is a control change code to allow the respective components of the electronic musical instrument to be controlled in accordance with the next two-byte data. "5AH" is a code indicating that the next data represents the transmitted level of a dry sound signal (dry sound transmitted level) Vd. As the value "n", any of MIDI channel numbers from "0" to "F" can be designated. "H" indicates that the effect data are in hexadecimal representation. Thus, the following effects can be designated for each channel independently from the other channels. In this connection, it is assumed that a set of necessary registers is provided for each channel, although not expressly noted herein. It is also assumed here that the default of the dry sound transmitted level is 7FH and the dry sound transmitted level can take on any one value ranging from 00H to 7FH. When "5AH+VD" has been received, the CPU 2 corrects the dry sound transmitted level Vd in accordance with the then set levels of other effect tones and also sets the dry sound volume level in accordance with the corrected level Vd.

More specifically, the dry sound transmitted level Vd is added with volumes corresponding to those of reverberation, tremolo, chorus, celeste and phaser effects which can not be achieved by the electronic musical instrument (i.e., celeste and phaser effects in this embodiment). Namely, if the transmitted level of each effect that can not be achieved by the electronic musical instrument is Ve, the total dry sound transmitted level can be calculated by the following equation:

$$L=20 \log \{(Vd^4+\Sigma Ve^4/16)^{1/2}/127^2\} \quad (1)$$

where L is the summed dry sound volume level (dB), and $\Sigma Ve^4$ is the sum of the 4th powers of the transmitted level of each effect that can not be achieved by the electronic musical instrument. The dry sound volume level L is delivered to the effect circuitry 7, which, in accordance with the level L, sets the multiplier number for the multiplier 21. In this embodiment, the summed volume levels exceeding 0 dB are all regarded as 0 dB, and it is assumed that when $(Vd^4+\Sigma Ve^4/16)^{1/2}=0$, $L=-\infty$ (zero volume). It is further assumed that the volumes below the lower limit value of the dynamic range of the dry sound transmitted amount are substituted by the lower limit value.

(2) In the case where "BnH+5BH+V" has been received as effect data: "5BH" is a code indicating that the next data is representative of the transmitted level of reverberation. When this effect data has been received, the CPU 2 calculates a reverberation level L and delivers the calculated reverberation level L to the effect circuitry 7, which, in accordance with the level L, sets the multiplier number for the multiplier 22:

$$L=20 \log (V^2/127^2) \quad (2)$$

(3) Levels of other effects than reverberation, i.e., tremolo, chorus, celeste and phaser are set in a similar manner to that mentioned in item (2) above using the level obtained by Equation (2), except that the code "5BH" is replaced by "5CH", "5DH" and "5EH", respectively. Of course, when there has been received effect data for any effect that can not be achieved by the electronic musical instrument, the transmitted level V of the received effect is only stored for use as "Ve" of item (1) but is not set into the effect circuitry 7. It is also assumed that when V=0 in items (2) and (3), $L=-\infty$ (zero volume). Further, the volume levels of respective return sounds of the effects are set in such a manner that they give a feeling of volume amount of approximately −12dB when the transmitted levels are the greatest. In this embodiment, any volumes below the lower limit value of the dynamic range of the transmitted amount are substituted by the lower limit value. Further, in this embodiment, the default of the transmitted level V of reverberation is 40H, and the defaults of the transmitted levels V of the other effects are 00H.

Next, with reference to FIGS. 3 to 13, a further detailed description will be given on the operation of the electronic musical instrument in accordance with the embodiment.

Figure 3:
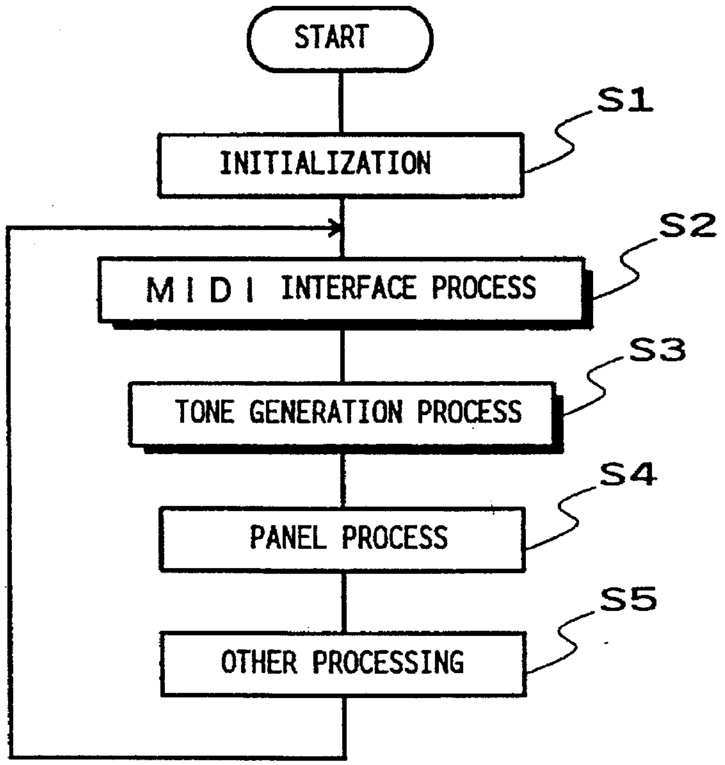
FIG. 3 is a flowchart of an example of a main routine performed by a CPU of FIG. 1.

FIG. 3 illustrates the operational flow of a main routine carried out in the electronic musical instrument of the embodiment. Upon power-on of the electronic musical instrument, a predetermined initialization process is performed in step S1. Then, a MIDI interface process is performed in step S2 followed by a tone generation process in step S3, a panel process in step S4 and other processing in step S5. Upon completion of step 5, the routine reverts to step S2 for sequential repetition of the processes of steps S2 to S5.

Figure 4:
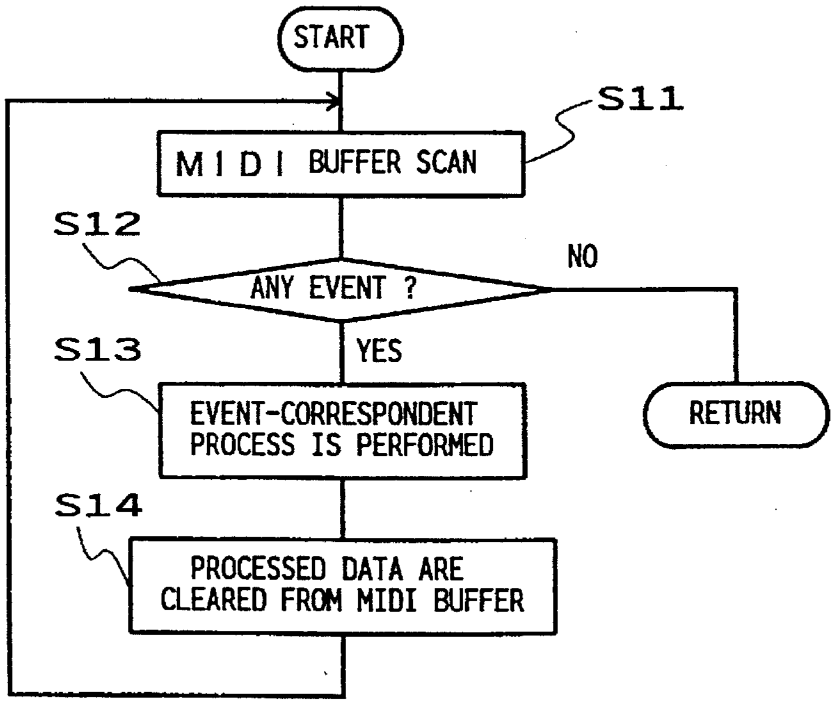
FIG. 4 is a flowchart of a MIDI interface process routine of FIG. 3.

FIG. 4 illustrates the operational flow of the MIDI interface process routine shown in step S2 of FIG. 3. First, the MIDI buffer memory is scanned in step S11, because, as mentioned earlier, every received data is stored into this buffer memory. It is then determined in step S12 whether any event data is stored in the MIDI buffer memory. If no event data is stored, the routine directly returns to the main routine.

Figure 5:
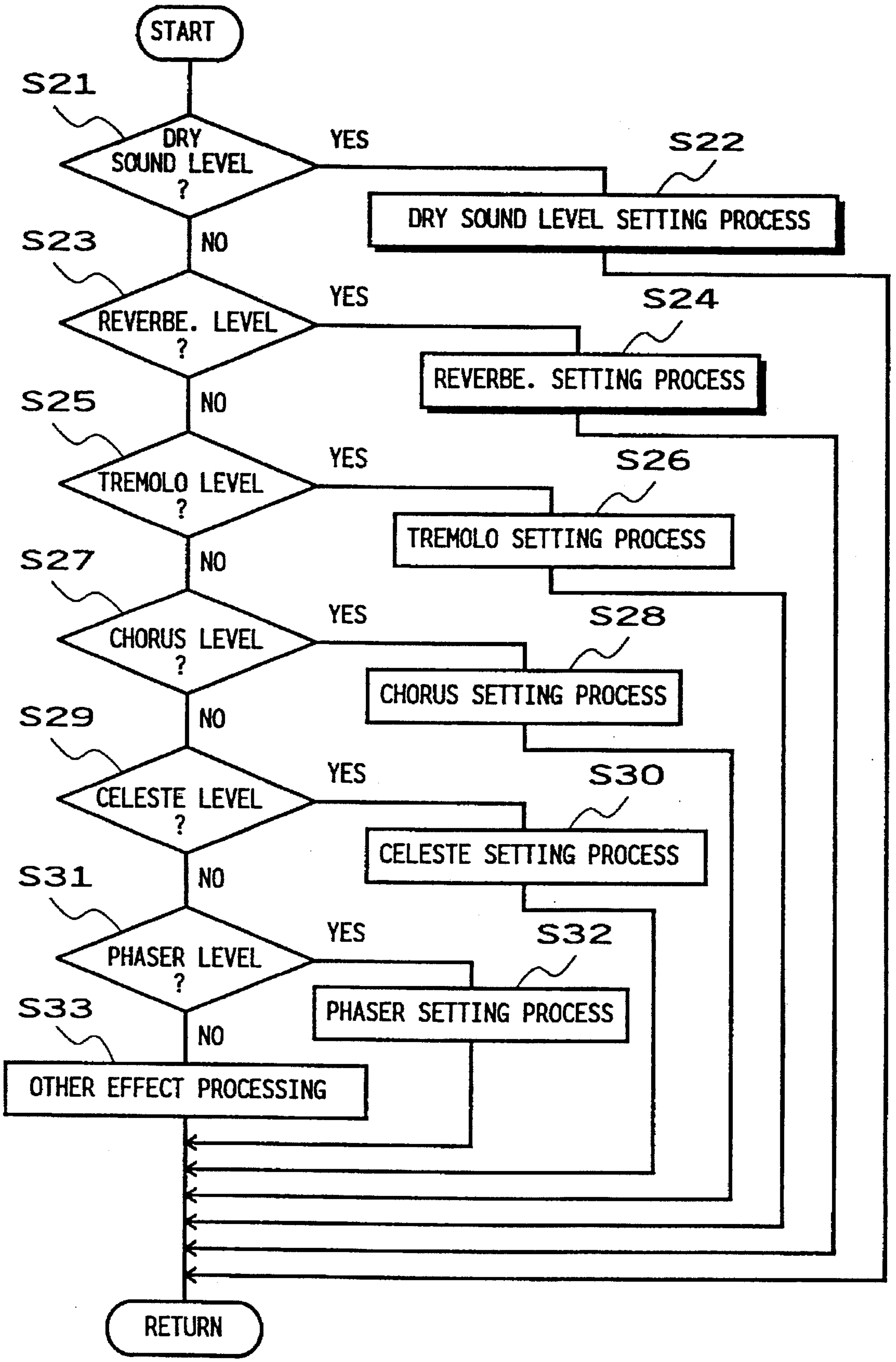
FIG. 5 is a flowchart of an effect process routine.

With a determination in step S12 that some event data is stored in the MIDI buffer memory, any of event-correspondent processes of FIG. 5 and other figures is performed in step S13 depending on a specific event represented by the event data. After completion of the event-correspondent process, the event data representing the completed event is cleared in step S14 from the MIDI buffer memory, and the routine reverts to step S11 to repeat steps S11 to S14 as long as any other event data is left in the MIDI buffer memory.

FIG. 5 illustrates the operational flow of an effect process routine that is read out and performed in step S13 of FIG. 4, independently for each MIDI channel. First, in step S21, it is determined whether or not effect data stored in the MIDI buffer memory is one that instructs setting of a dry sound level (as in the case of item (1) above). If the answer in step S21 is in the affirmative, a dry sound level setting process is performed in step S22, and then the routine returns to the main routine.

If, on the other hand, the determination in step S21 is that the effect data in the MIDI buffer memory is not such data instructing setting of a dry sound level, it is further determined in step S23 whether the effect data is one instructing setting of a reverberation level (as in the case of item (2) above). If the answer in step S23 is in the affirmative, a reverberation setting process is performed in step S24, and then the routine returns to the main routine.12

If the determination in step S23 is that the effect data in the MIDI buffer memory is not such data instructing setting of a reverberation level, it is further determined in step S25 whether the effect data is one instructing setting of a tremolo level. If the answer in step S25 is in the affirmative, a tremolo setting process is performed in step S26, and then the routine returns to the main routine.

If the determination in step S25 is that the effect data in the MIDI buffer memory is not such data instructing setting of a tremolo level, it is further determined in step S27 whether the effect data is one instructing setting of a chorus level. If the answer in step S27 is in the affirmative, a chorus setting process is performed in step S28, and then the routine returns to the main routine.

If the determination in step S27 is that the effect data in the MIDI buffer memory is not such data instructing setting of a chorus level, it is further determined in step S29 whether the effect data is one instructing setting of a celeste level. If the answer in step S29 is in the affirmative, a celeste setting process is performed in step S30, and then the routine returns to the main routine.

If the determination in step S29 is that the effect data in the MIDI buffer memory is not such data instructing setting of a celeste level, it is further determined in step S31 whether the effect data is one instructing setting of a phaser level. If the answer in step S31 is in the affirmative, a phaser setting process is performed in step S32, and then the routine returns to the main routine. If the data in the buffer memory is not such data instructing setting of a phaser level, the routine performs other necessary processing before returning to the main routine.

Figure 6:
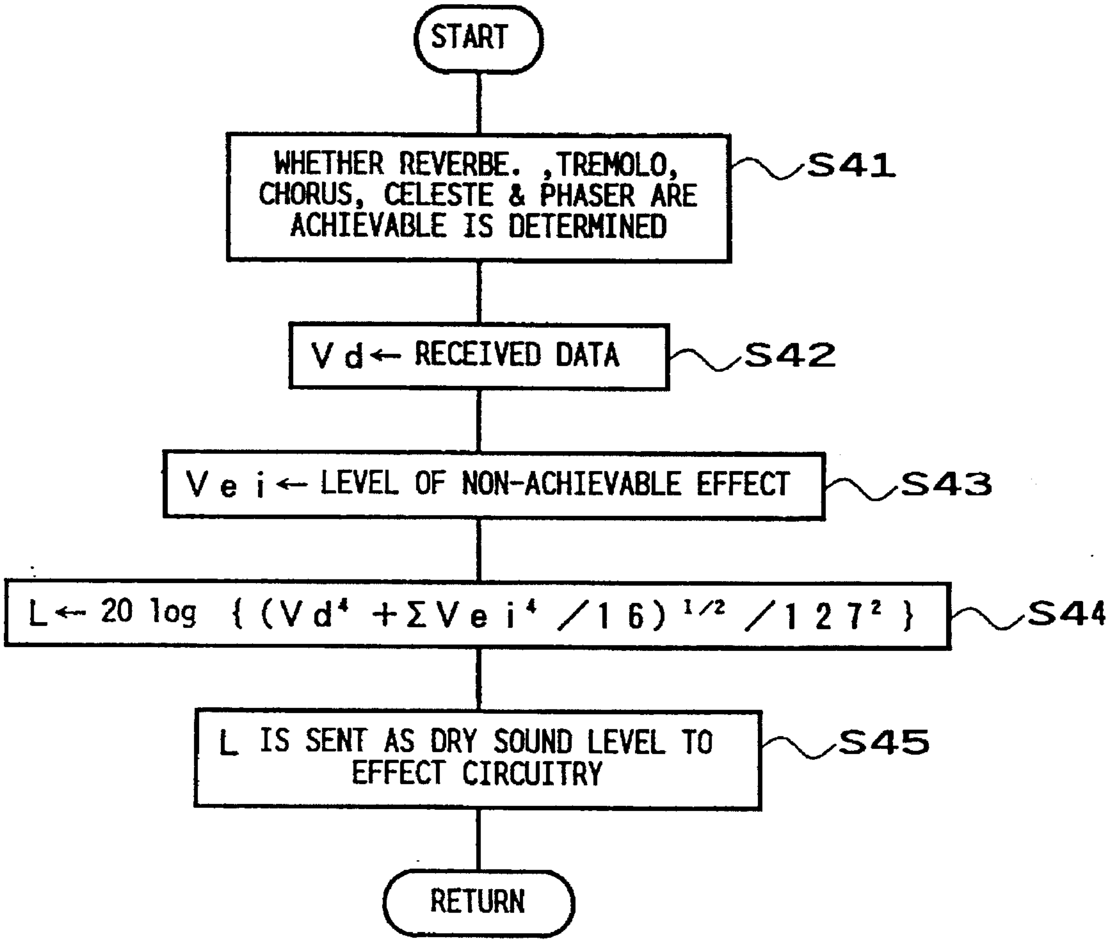
FIG. 6 is a flowchart of a dry level setting process routine.

FIG. 6 illustrates the operational flow of the dry level setting process routine that is read out and performed in step 220f FIG. 5. First, in step S41, it is determined whether the effect circuitry 7 of the electronic musical instrument has necessary arrangements for achieving reverberation, tremolo, chorus, celeste and phaser effects. Next, in step S42, data representative of the dry sound transmitted level as received is set into register Vd.

Further, in step S43, the level of any of the effects for which the effect circuitry 7 has no necessary arrangement, i.e., which is not achievable by the effect circuitry 7 of the instrument is set into register Ve1. In this embodiment, because celeste and phaser effects are not achievable, current celeste and phaser levels are set into registers Ve1 and Ve2, respectively.

Then, in step S44, $L=20 \log [(Vd^4+\Sigma Ve1^4/16)^{1/2}/127^2]$ is calculated. This is a calculation of Equation (1) noted in item (1) above. In this embodiment, $\Sigma Ve1^4$ equals $Ve1^4+Ve2^2$. If the summed volume level exceeds 0 dB, it is provided as 0 dB.

Then, in step S45, the calculation result L is sent as a dry sound level to the effect circuitry 7, so that the multiplier number for the multiplier 21 is set in accordance with the dry sound level L. After step S45, the routine returns to the main routine.

Figure 7:
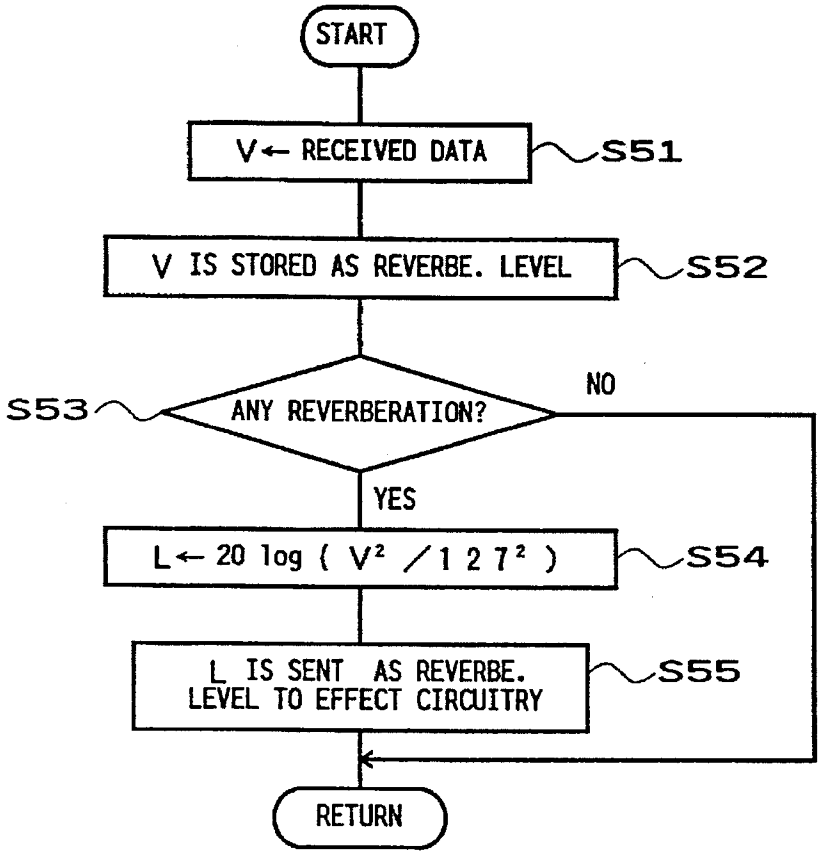
FIG. 7 is a flowchart of a reverberation setting process routine.

FIG. 7 illustrates the operational flow of the reverberation setting process routine that is performed in step S24 of FIG. 5. First, in step S51, the reverberation transmitted level data as received is set into register the V. Then, in step S52, the send level V is stored, as a reverberation level, into a predetermined register. The reason why the reverberation level is stored is that, in case the effect circuitry 7 has no necessary arrangement for reverberation, the stored level is used, in the above-mentioned step S43 of FIG. 6, as a level of non-achievable effect.

Next, in step S53, it is determined whether or not the effect circuitry 7 has necessary arrangement for reverberation. With a negative determination in step S53, the routine directly returns to the main routine. If the effect circuitry 7 has necessary arrangement for reverberation, $L=20 \log (V^2/127^2)$ is calculated in step S54. This is a calculation of Equation (2) noted in item (2) above.

After that, in step S54, the calculation result L is delivered as a reverberation level to the effect circuitry 7, which in turn sets the multiplier number for the multiplier 22 in accordance with the reverberation level. After step S55, the routine returns to the main routine.

The tremolo setting process of step S26, chorus setting process of step S28, celeste setting process of step S30 and phaser setting process of step S32, all shown in FIG. 5, are performed in a similar manner to the above-mentioned reverberation setting process of FIG. 7. Namely, the transmitted levels of the effects as received are set into the register V and stored in predetermined register. Then, it is determined whether the effect circuitry 7 has necessary arrangements for achieving the effects. With an affirmative determination, respective levels L of the effects are calculated using Equation (2) as in the above-mentioned steps S54, S55, the calculated levels L are delivered, as respective levels of the effects, to the effect circuitry 7.

In this embodiment, because the effect circuitry 7 has no arrangements for celeste and phaser effects, no processes corresponding to steps S54 and S55 are not performed in the celeste setting process of step S30 and phaser setting process of step S32.

Next, with reference to FIGS. 8 to 12, a description will be given on other process routines read out in step S13 of FIG. 4. The following registers are used in these process routines.

(1) BSL (i): Register for storing bank select LSB for each MIDI channel. Argument i represents a MIDI channel number.

(2) BSM (i): Register for storing bank select MSB for each MIDI channel. Argument i represents a MIDI channel number.

(3) KC: Register for storing a key code.

(4) KEV: Register for storing a key event (key-on or key-off event).

(5) KV: Register for storing a key velocity.

(6) LSD (i): Temporary register for temporarily storing bank select LSB for each MIDI channel. Argument i represents a MIDI channel number.

(7) M: Register for storing master tuning data.

(8) MCH: Register for storing a MIDI channel number.

(9) MSD (i): Temporary register for temporarily storing bank select MSB for each MIDI channel. Argument i represents a MIDI channel number.

(10) MTUN: Register for storing a final calculated value for master tuning.

(11) MVOL: Register for storing a final calculated value for master volume.

(12) PC (i): Register for storing a program change number for each MIDI channel. Argument i represents a MIDI channel number.

(13) PD (i): Temporary register for temporarily storing a program change number for each MIDI channel. Argument i represents a MIDI channel number.

(14) TCH: Register for storing an empty channel number.

(15) VD (i): Temporary register for temporarily storing vibrato data for each MIDI channel. Argument i represents a MIDI channel number.

(16) VDE: Register for storing a final calculated value of vibrato data for each MIDI channel.

(17) VMIN: Register for storing a minimum vibrato modulation depth for each tone color.

(18) VSENS: Register for storing vibrato sensitivity for each tone color.

(19) LBSL (i): Register for, for each MIDI channel i, storing bank select LSB (i.e., melody tone color bank information) that was utilized last (most recently) in the musical instrument as tone color of bank select MSB=00H (i.e., melody tone color category). Argument i represents a MIDI channel number.

(20) LPC (i): Register for, for each MIDI channel i, storing a program change number that was utilized last (most recently) as tone color of bank select MSB=7FH (i.e., rhythm tone color category). Here, again, argument i represents a MIDI channel number.

(21) USER: Flag register for, when melody tone color other than MSB=0 has been selected, indicating whether the selected tone color is achievable by the electronic musical instrument.

All these registers are initialized to "0" in the initialization process of the main routine.

To facilitate understanding of the following description, an outline on a tone color designation method employed in the embodiment will be given below.

According to the embodiment, any one tone color can be designated by three classes of tone color designating information. The highest-class tone color designating information is one for designating one of plural tone color categories and will be referred to as "bank select MSB" in the embodiment. The "bank select MSB" comprises binary data of eight bits, for example, and designates a tone color category by its data value. For instance, data value "00H" ("0" in the hexadecimal system) of bank select MSB designates a melody tone color category, and "7FH" ("7F" in the hexadecimal system, or "127" in the decimal system) designates a rhythm tone color category. One tone color category includes at least one tone color bank. The second-class tone color designating information is one for designating one of tone color banks, each of which has a plurality (128, for example) of tone colors. The last-class tone color designating information is one for designating individual one of tone colors.

In this embodiment, designations by the second- and last-class tone color designating information are performed differently between melody tone colors and rhythm tone colors. First, designation of melody tone colors will be explained briefly as follows. "bank select LSB" is used as bank designating information for melody tone colors, and "program change" information is used as individual tone color designating information for melody tone colors. A value indicated by the program change information (i.e., program change number) can designates one of 128 tone colors contained in a tone color bank. Thus, by the use of the three class tone color designating information, "bank select MSB", "bank select LSB" and "program change", a specific tone color can be designated.

In such a case where one tone color category contains plural tone color banks, tone colors of a same program change number in the respective tone color banks can be designated by a same tone color name, but they are in such relationship that they are different in minute tone color characteristics (although the present invention is, of course, not limited to such relationship). These tone color banks may sometimes be called "variation". Each musical instrument has at least one tone color bank in each tone color category. Of course, expensive, high-grade models will have more "variations". In particular, in the case of the category corresponding to data value "00H" of bank select MSB (melody tone color category), each combination of bank number and program change number may designate tone color common to plural models of musical instruments, and therefore such tone colors may be called a common tone color group. Therefore, as long as the same bank number (or variation number) and program change number of the common tone color group (melody tone color category) is used in different models of musical instruments, a substantially same tone color can be achieved in each of the musical instruments. Further, even if the bank number (variation number) is different among the instruments, a similar tone color can be achieved in each of the instruments provided that the program change number is the same. Accordingly, even when a high-grade musical instrument has sent a lower-grade musical instrument individual tone color designating information (program change number) representing such a tone color bank (variation) which is not provided in the lower-grade musical instrument, the latter instrument can perform natural tone color replacement by selecting, as an alternative, a tone color of a same tone color number as the program change number from among a tone color bank (standard or variation) that is present in the instrument.

As a means to smoothly perform such a tone color replacement process for the melody tone color category, the above-mentioned register LBSL (i) is provided in the embodiment. Namely, by storing last-used "bank select LSB" data in the register LBSL (i), one of tone color bank variations available (i.e., present) in the musical instrument, and thus the data stored in the register LSBL (i) can be used reasonably and smoothly, in the tone color replacement, as a representative of tone color bank variations present in the instrument.

Next, designation of rhythm tone colors will be explained briefly as follows. "program change" information is used, as bank designating information for the rhythm tone color category, in stead of "bank select LSB", and "key code" is used as individual rhythm tone color information. Thus, by the use of three-class tone color designating information comprising "bank select MSB", "program change" and "key code", specific one of tone colors in the rhythm tone color category can be designated. Similarly to the above-mentioned, some of the musical instruments may have plural rhythm tone color banks (variations) and the other may have only one rhythm tone color bank. However, in the case of the category corresponding to data value "7FH" of bank select MSB (rhythm tone color category), each combination of bank number and program change number may designate tone color common to plural models of musical instruments, and therefore such tone colors may also be called a common tone color group. Therefore, as long as the same program change number (i.e., variation information) and key code (i.e., individual rhythm tone color designating information) of the common tone color group (rhythm tone color category) is used in different models of musical instruments, a substantially same tone color can be achieved in each of the musical instruments. Further, even if the program change number (i.e., variation information) is different among the instruments, a similar tone color can be achieved in each of the instruments provided that the key code (i.e., individual rhythm tone color designating information) is the same. Accordingly, even when a high-grade musical instrument has sent a lower-grade musical instrument a key code (i.e., individual rhythm tone color designating information which is not provided in the lower-grade musical instrument, the latter instrument can perform natural tone color replacement by selecting, as an alternative, a tone color of a same tone color number as the key code from among a rhythm tone color bank (standard or variation) that is present in the instrument.

As a means to smoothly perform such a tone color replacement process for the rhythm tone color category, the above-mentioned register LPC (i) is provided in the embodiment. Namely, by storing last-used "program change number" data in the register LPC (i), one of rhythm tone color bank variations available (i.e., present) in the musical instrument, and thus the data stored in the register LPC (i) can be used reasonably and smoothly, in the tone color replacement, as a representative of rhythm tone color bank variations present in the instrument.

Bank select MSB can take on various values other than the above-mentioned "00H" and "7FH", and such other data values are open for individual musical instruments so that tone color designating information representative of user-specific tone color categories can be allotted in the instruments. Each musical instrument, if any tone color set unique or peculiar to the instrument has been prepared by the user or factory-preset, will have a predetermined data value of "bank select MSB" representing the user-specific tone color category. Therefore, where the data value of bank select MSB received from outside via the MIDI interface is other than "00H" and "7FH", the value represents a user-specific tone color category; in this case, if user tone colors corresponding to the data value are present in the musical instrument in question, the instrument can achieve the tone colors, and if not, the instrument can not achieve the tone color. Thus, such tone colors of the user-specific tone color category represented by bank select MSB data values other than "00H" and "7FH" can be said to be a group of tone colors peculiar to the individual musical instrument. The above-mentioned register USER is provided for storing data that indicates whether the data-receiving musical instrument has such a user-specific tone color category as designated by "bank select MSB" information supplied from outside.

Figure 8:
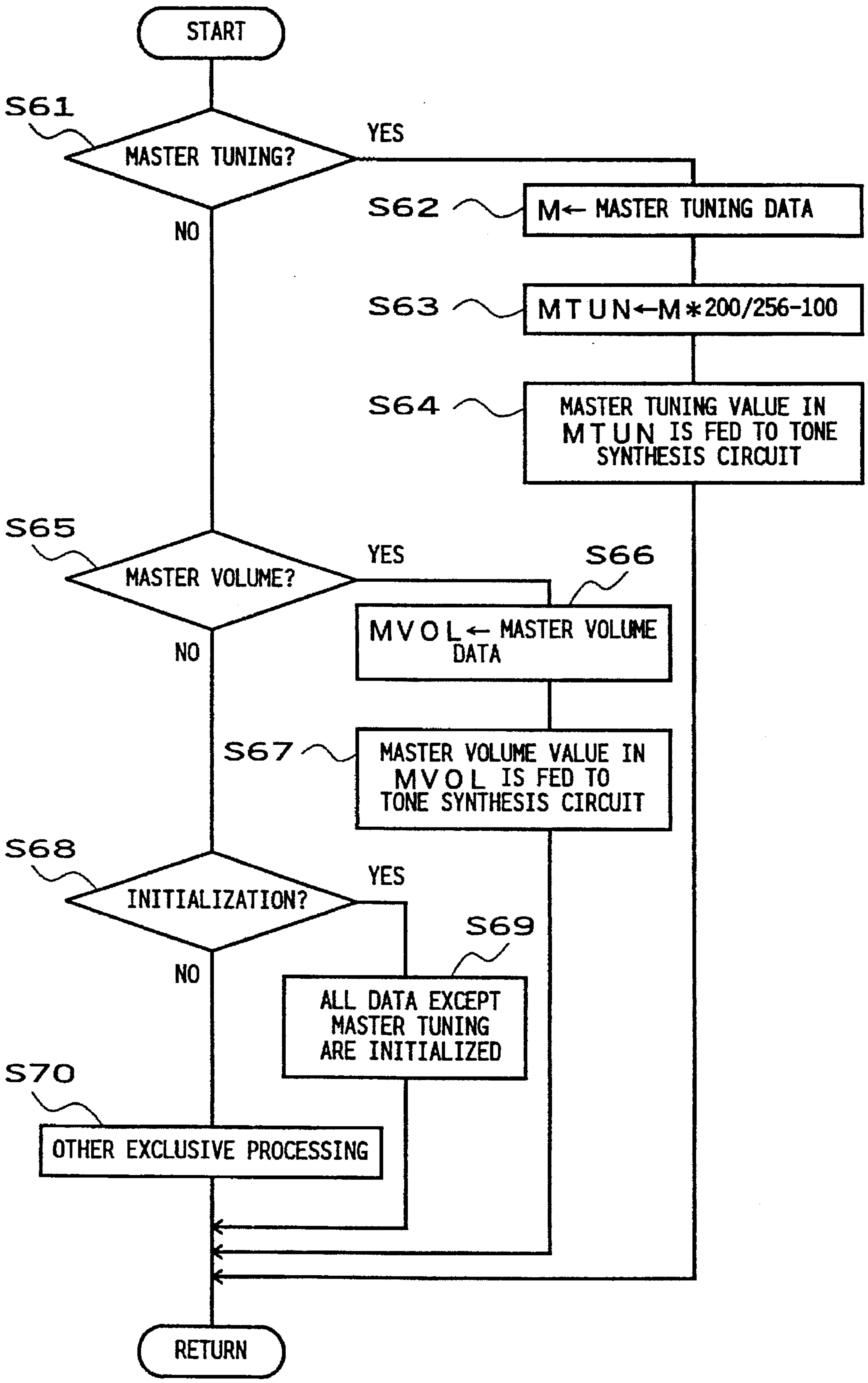
FIG. 8 is a flowchart of an exclusive process routine.

FIG. 8 illustrates the operational flow of an exclusive process routine that is read out and performed in step S13 of FIG. 14 upon receipt of an exclusive message via the MIDI interface.

First, in step S61, it is determined whether the exclusive data received and stored in the MIDI buffer memory is one that instructs setting of master tuning. If the answer is in the affirmative, the received master tuning data is set into the register M in step S62. It is assumed that the data range is within a range from 00H to FFH and the default is 7FH.

Then, the routine goes to step S63, where a final calculated value MTUN for master tuning is obtained on the basis of the value set in register M. For example, the value MTUN is a value −100 when the value in register M is 00H and is approximately a value 100 when the value in register M is 7FH. By interpreting the value MTUN in cent value, it is possible to set master tuning to within ± one semitone from a standard pitch.

Further, in step S64, the value in register MTUN is fed to the tone synthesis circuit, and then the routine reverts to step S14 of FIG. 4. In the tone synthesis circuit, the master tuning may be modified immediately upon receipt of the value MTUN (i.e., even when a certain tone is being sounded), or the master tuning may be modified before generation of a new tone rather than during generation of the current tone.

If the determination in step S61 is that the data in the MIDI buffer memory is not data instructing setting of master tuning, the routine goes to step S65 to further determine whether the data is one instructing setting of master volume. With an affirmative determination in step S65, the received master volume data is set into the register MVOL. It is assumed here that the master volume data ranges from 00H to 7FH.

Then, in step S67, the value in the register MVOL is fed to the tone synthesis circuit 6. Because the master volume data is data to be processed in real time, volume in each channel is caused to change the moment the master volume data is received by the tone synthesis circuit 6. After that, the routine reverts to step S14 of FIG. 4.

If the determination in step S65 is that the data in the MIDI buffer memory is not data instructing setting of master volume, then it is further determined in step S68 whether the data is one instructing initialization of the system. With an affirmative determination in step S68, various settings except for master tuning are initialized.

In order to perform an ensemble with a common-type natural musical instrument and a natural musical instrument capable of receiving MIDI signals, the player has to conduct ultimate tuning between the musical instruments. The tuning, in general, may be time-consuming, but once it is done, it does not require readjustment for a relatively long time. In contrast, the system initialization is performed relatively frequently, to, for example, eliminate unnecessary settings before transmitting new data at a changing point of a music piece or the like. Accordingly, in this embodiment, only the master tuning data is not initialized. In the initialization process, the following information is initialized:

dry sound transmitted level←7FH;
each effect level←00H;
master tuning←7FH;
master volume←7FH;
program change←00H;
bank select MSB←00H;
bank select MSB←7FH (only in the case of MIDI channel 10);
bank select LSB←00H; and
vibrato data←00H.

After the above-noted initialization, the routine reverts to step S14 of FIG. 4.

If the determination in step S68 is that the data in the MIDI buffer memory is not such data instructing initialization, the routine performs other exclusive processing in step S70 and then reverts to step S14 of FIG. 4.

Figure 9:
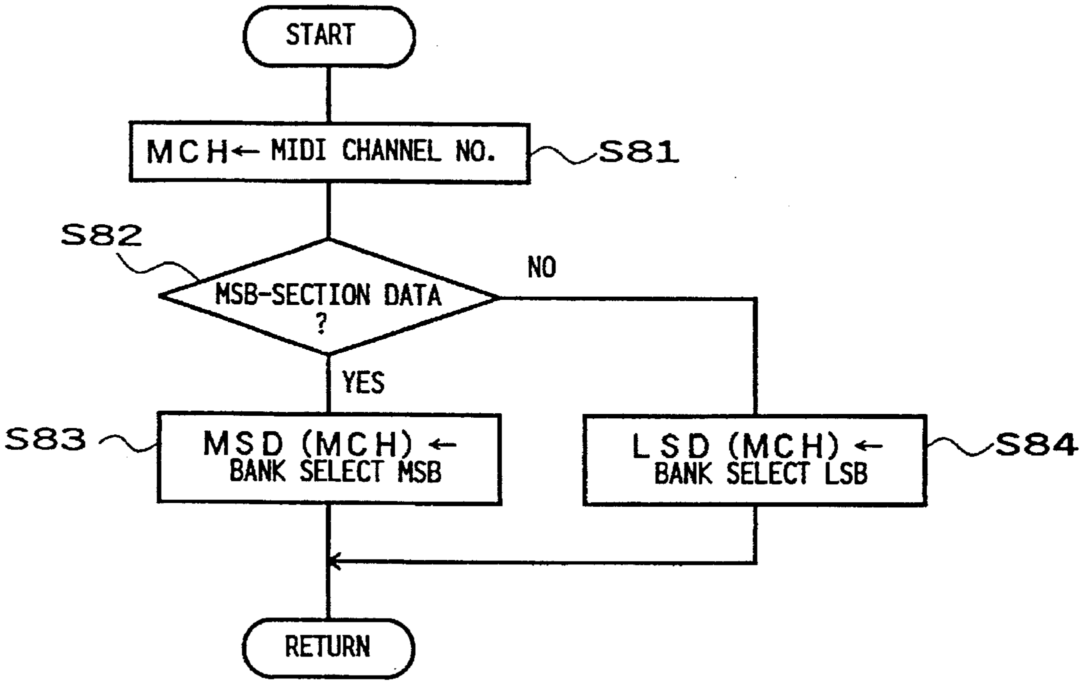
FIG. 9 is a flowchart of a bank select process routine.

FIG. 9 illustrates the operational flow of the bank select process routine that is read out performed in step S13 of FIG. 4 upon receipt of a bank select signal via the MIDI interface. As previously mentioned, the bank select information has both MSB section and LSB section. As mentioned, the bank select MSB information (hereinafter referred to simply as bank select MSB) is used for designating one of the melody tone color, rhythm tone color and user-specific tone color categories and comprises eight-bit binary data. The bank select LSB information (hereinafter referred to simply as bank select LSB) designates a tone color bank (variation) of melody tone color and user-specific tone color.

First, in step S81, the MIDI channel number of the received bank select signal is set into the register MCH. Then, the routine goes to step S82 to determine whether the received bank select signal is MSB-section data. If the answer is in the affirmative, the received bank select MSB is stored, in step S83, into the temporary register MSD provided for each MIDI channel, and then the routine returns to the main routine.

If the determination in step S82 is that the received bank select signal is not MSB-section data (i.e., LSB-section data), the routine goes to step S84 to store the received data into the register LSD and then returns to the main routine.

An actual bank select operation is performed when a program change signal for designating an individual tone color in the designated bank is received as will be later described, and hence data of bank select MSB and LSB are stored, in this step, into the respective temporary registers MSD and LSD.

Figure 10:
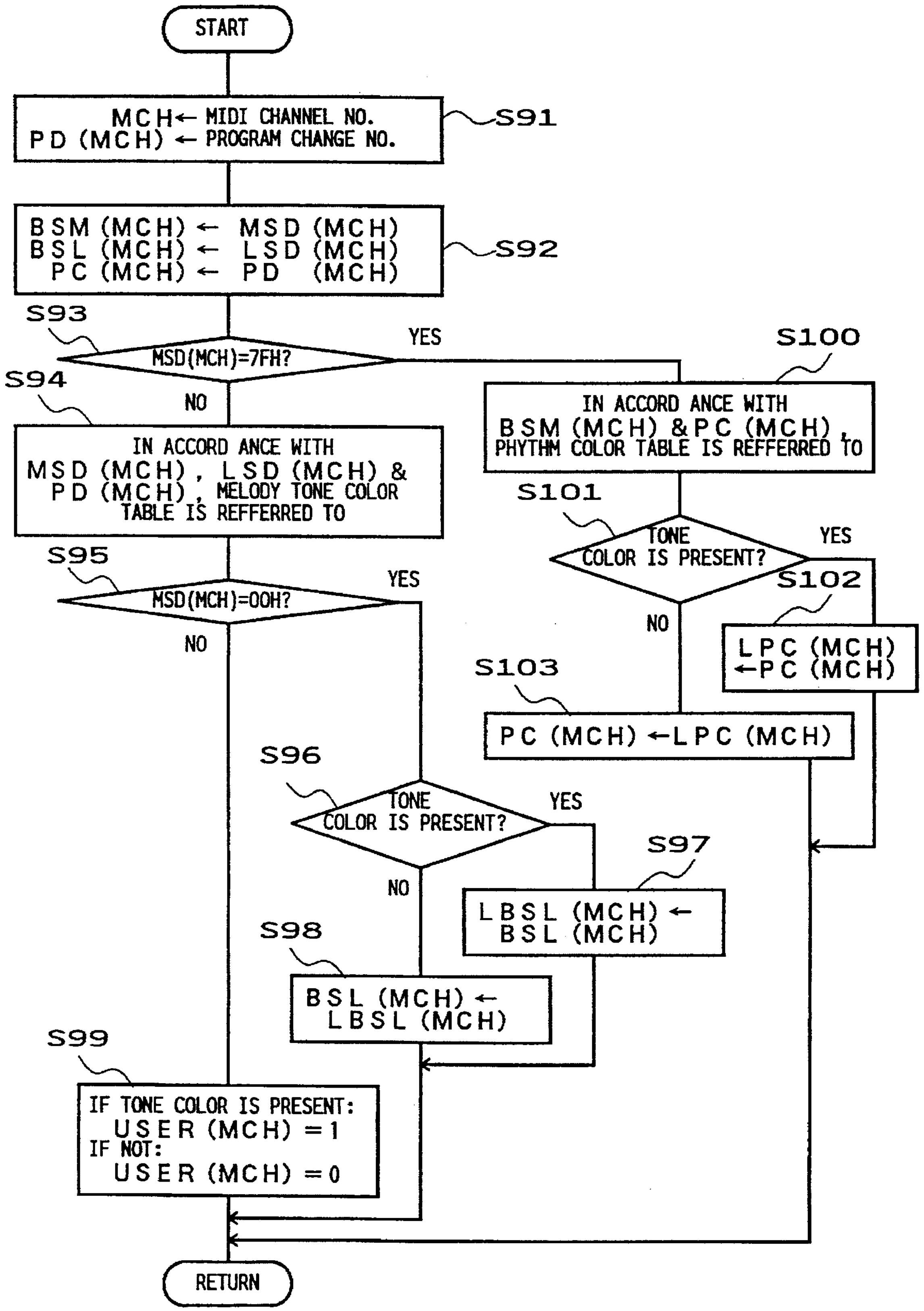
FIG. 10 is a flowchart of a program change process routine.

FIG. 10 illustrates the operational flow of the program change process routine that is read out and performed in step S13 of FIG. 4 upon receipt of program change data via the MIDI interface. As well known, the term "program change" according to MIDI protocol represents a tone color change.

First, in step S91, the MIDI channel number of the received program change data is set into the register MCH, and the program change number itself is set into the temporary register PD (MCH) for program change data. Next, in step S92, the received bank select data and program change data are temporarily stored into respective registers BSM (MCH), BSL(MCH) and PC(MCH).

Then, the routine goes to step S93 to determine whether the data of bank select MSB assigned to the MIDI channel is 7FH. If the bank select is 7FH, it means that rhythm tone color is assigned to the MIDI channel. As previously mentioned and will be described below, interpretation of the program change and bank select vary in dependence on whether rhythm tone color or melody tone color is assigned.

If melody tone color is assigned to the MIDI channel indicated by the register MCH, a melody tone color table is referred to, in step S94, in accordance with the bank select MSB, bank select LSB and program change PD of the MCH channel. The melody tone color table contains addresses of storage areas of actual tone data, on the basis of which it is also possible to determine whether the received or designated tone color is present in, i.e., achievable by the electronic musical instrument.

In step S95, a determination is made on whether the bank select MSB is 00H. If the answer is in the affirmative, it means that the designated tone color is among a set of tone colors common to the musical instruments, so that a tone color replacement process is performed beginning in step S96.

All the musical instruments employing the common set of tone colors may not necessarily have arrangements for all the tone colors of the set, depending on their performances. So, when employing the common tone color set, the electronic musical instrument of the embodiment is designed to select tone color in accordance with the program change and also select a tone color variation in accordance with the bank select LSB. Thus, a high-performance instrument may have a variety of tone color variations by extension of bank select LSB, while a low-performance or less expensive instrument may have only one tone color set.

But, even in such a case, tone color can be sounded with a minimized sense of incompatibility, by only sounding the tone color in accordance with the same program change numbers. So, if the designated tone color is not exactly achievable by the musical instrument in question but is among those of the common tone color set, a process is performed for replacing the tone color with an approximate tone color (i.e., tone color of a different bank number but of the same program change number). As will be described below, while referring to the register LBSL (MCH) in step S98, the tone color set (bank) as dictated by the last-confirmed bank select LSB stored in the register LBSL (MCH) is designated as an alternative.

In step S96, on the basis of the determination in step S94, a further determination is made on whether a tone color exactly corresponding to the designated tone color is present in the electronic musical instrument. If such a corresponding tone color is present in and hence achievable by the musical instrument, then no modification to these information stored in step S92 is effected because tone can be generated on the stored information, and then the data in the register BSL is set, in step S97, into the register LBSL as the last-confirmed number of bank select LSB. After that, the routine returns to the main routine. Therefore, the stored contents in the register LBSL expressly indicates one of the tone color banks achievable by the musical instrument.

Conversely, if the determination in step S96 is that the designated tone color is no achievable by the musical instrument in question, the routine goes to step S98, where the bank select LSB data in the register BSL (MCH), out of the various information set in step S92, is replaced with the data stored in the register LBSL. Subsequently, the routine returns to the main routine. In this manner, if the bank select MSB is 00H, tone color replacement is performed of the tone color set (bank) represented by the bank select LSB.

If the determination in step S95 is that the bank select MSB is not 00H, it means that the designated tone color is not among the common tone color set but among a tone color set peculiar to the electronic musical instrument. In such a case, it is not allowed to perform tone color replacement as in the case of the common tone colors. Therefore, if there is the corresponding tone color, tone is generated with that tone color; if not, at least no tone is generated, or a tone generation channel assignment procedure itself may be omitted not to waste the tone generation channels.

In step S99, the register USER is set in accordance with the determination result of step S94. Value thus set in the register USER is used in the tone generation process which will be later described in detail in relation to FIG. 13, in such a manner that if USER=0, the tone generation channel assignment procedure itself is not performed.

Then, if the determination in step S93 is that the value in the register MSD is 7FH, the routine proceeds to step S100, where, on the basis of the data in the register BSM for storing bank select LSB of a MIDI channel indicated by the register MCH and in the register PD for temporarily storing a program change number, it is determined whether or not there is any corresponding tone color present in the rhythm tone color table.

In the case of the rhythm tone colors as well, any tone colors that are not achievable by the musical instrument are replaced in the above-described manner. But, because, for the rhythm tone colors, each program change data designates a tone color bank, tone color replacement is performed using the program change data.

If it is determined in step S101 that a corresponding tone color is present in the musical instrument, tone is generated in accordance with the program change number set in step S92, and the data set into the register PC (MCH) is saved into the register LPC (MCH) in preparation for a future tone color replacement process. If it is determined in step S101 on another occasion that the designated tone color is not present in the register PC (MCH) is replaced, in step S103, with the program change number LPC stored in the register LPC (MCH). After that, the routine returns to the main routine.

As mentioned above, the bank select MSB serves to select a most general selection, such as a change between melody and rhythm tones, or a change in tone color sets peculiar to the individual instrument models. In particular, the bank select MSB=00H represents tone color common to the instruments, and any bank select MSB other than 00H represents tone color peculiar to the electronic musical instrument. Thus, in the case of tone colors common to the instruments, tone color replacement is reliably performed by selecting a bank which has been confirmed as usable for tone generation; in the case of tone colors peculiar to the electronic musical instrument, improper tone color change is prevented by performing no tone color replacement and generating no tone at all. Since the bank select LSB represents a variation within a same tone color family, change in the LSB will not cause much inconvenience.

Further, in the case of rhythm tone color (bank select MSB=7FH), tone color selection is made using a combination of program change data and key code in stead of the bank select LSB, as mentioned earlier. Here, also in the tone color bank designation operation based on the program change data, if there is no tone color corresponding to the tone color bank designated from outside, the tone color replacement is performed in the same manner as the melody tone color bank designation based on the bank select LSB.

Figure 11:
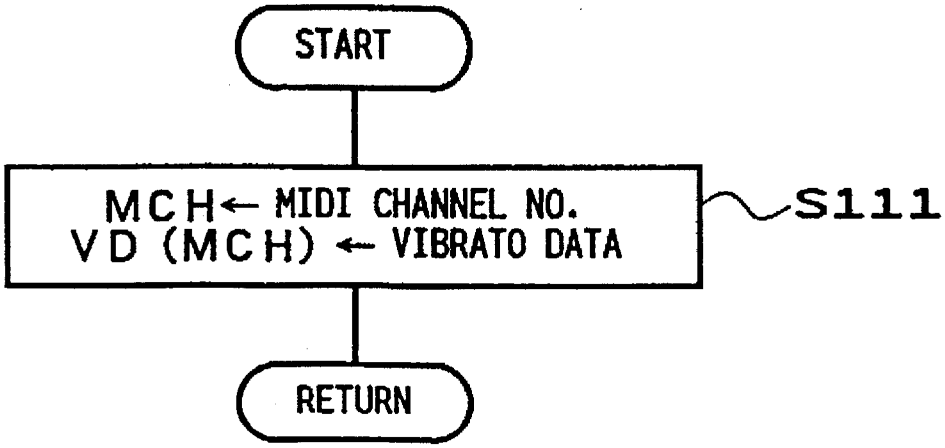
FIG. 11 is a flowchart of a vibrato process routine.

FIG. 11 illustrates the operational flow of the vibrato process routine that is read out and performed in step S13 of FIG. 4 upon receipt of vibrato data by way of the MIDI interface. It should be understood that the vibrato data received in the embodiment is data representative of a depth of vibrato.

In step S111 of this vibrato process routine, the MIDI channel number of the received program change is set into the register MCH and the vibrato data is set into the register VD (MCH). After that, the routine goes back to step S14 of FIG. 4.

In this instance, the vibrato data is only stored into register when it has been received, and then the data is actually referred to as vibrato information when the instrument has accepted tone generation for the corresponding MIDI channel. Alternative arrangements may be such that the vibrato information is transmitted to the tone synthesis circuit during this vibrato process and the vibrato process is performed in real time.

Figure 12:
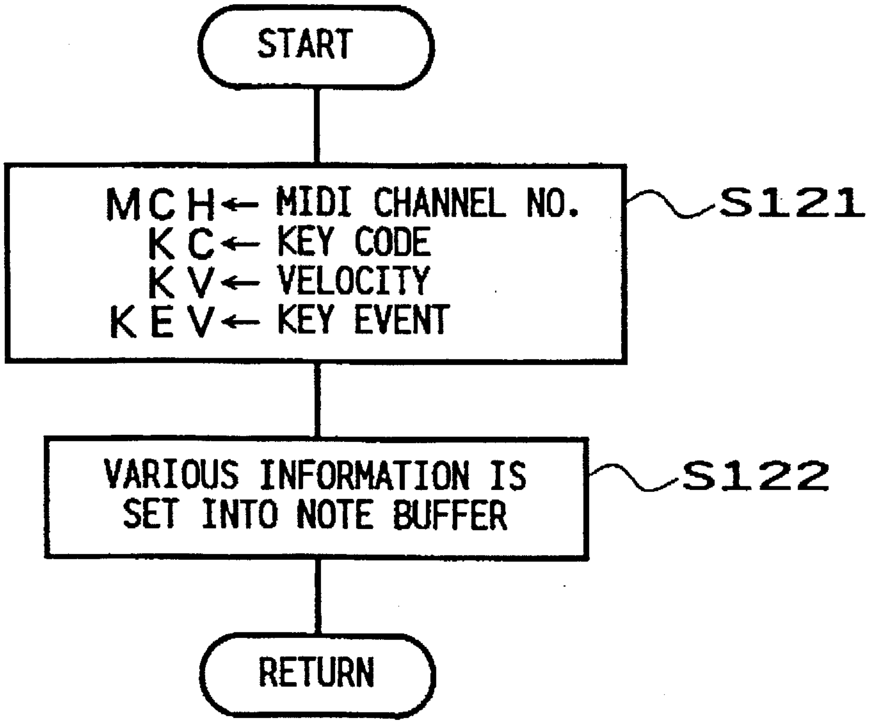
FIG. 12 is a flowchart of a note event process routine.

FIG. 12 illustrates the operational flow of the note-on event process that is read out and performed in step S13 of FIG. 4 upon receipt of note event data by way of the MIDI interface. First, in step S121 of this note-on event process, the MIDI channel number of the received program change is set into the register MCH, and various information such as key code, velocity and key event is set into the respective registers KC, KV and KEV. Into the register KEV is set key-on or key-off data. Then, in step S122, the thus set information is stored into a note buffer memory. After that, the routine goes back to step S14 of FIG. 4.

As has been described so far in relation to FIGS. 5 to 12, data received through the MIDI interface are processed in the MIDI interface process routine of FIG. 4 in accordance with the data contents. Once the MIDI buffer memory has run out of data to be processed, the routine goes back to step S3 of FIG. 3 to perform a tone generation process.

Figure 13:
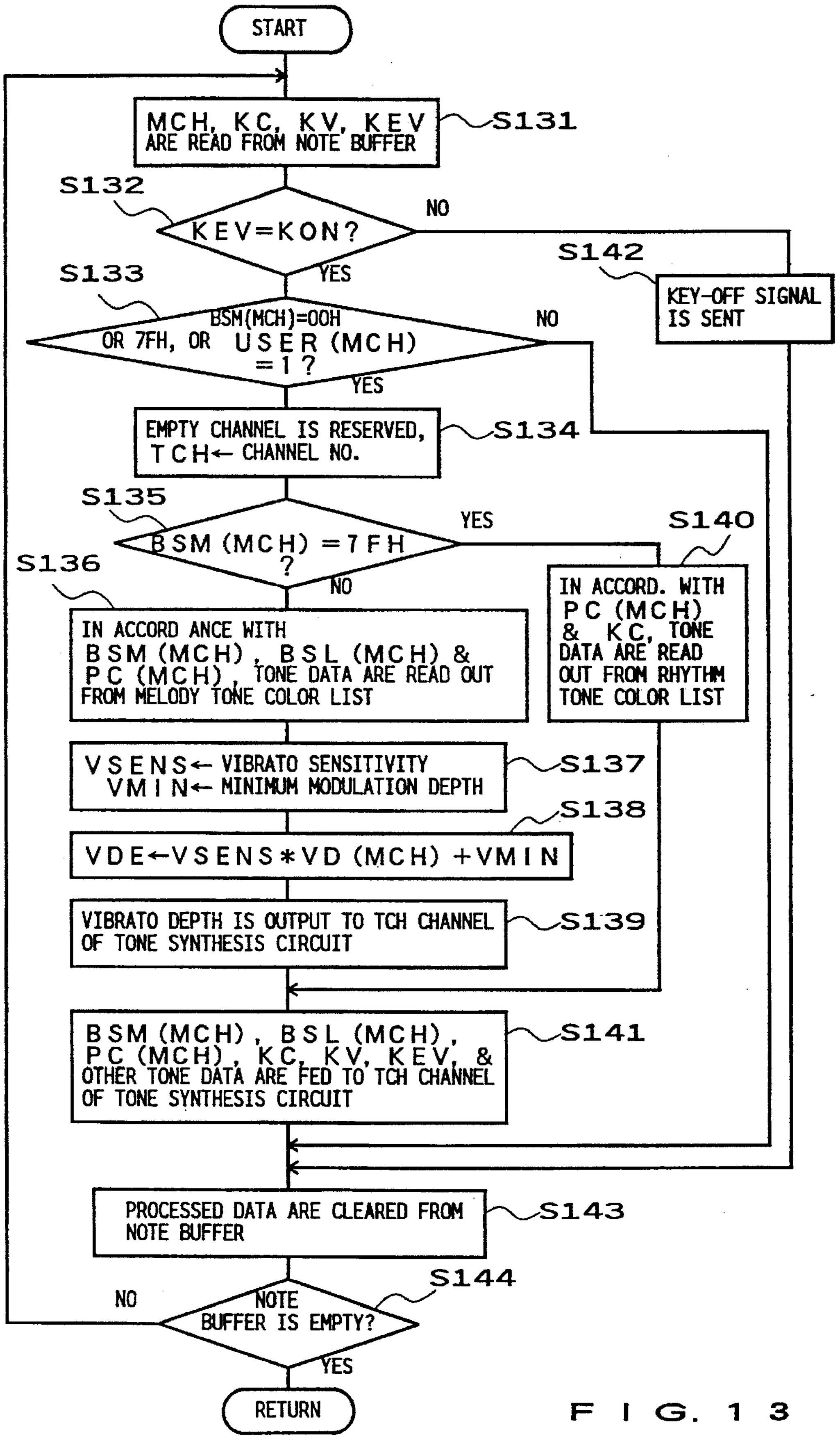
FIG. 13 is a flowchart of a tone generation process routine of FIG. 3.

FIG. 13 illustrates the operational flow of the tone generation process routine that is read out and performed in step S3 of FIG. 3. First, in step S131 of this tone generation process routine, various data written in step S122 of FIG. 12 are read out.

Next, in step S132, a determination is made on whether the read-out event is a key-on event. If the answer in step S132 is in the affirmative, it is further determined in step S133 whether the content in the register BSM (MCH) is "00H" (melody tone color) or "7FH" (rhythm tone color), and the content in the register USER (MCH) is "1" (user-specific tone color). If the content in the register USER is not "1" (i.e., USER=0), it means that the tone color is not preset in the instrument, and thus the routine proceeds to step S143 so as not to assign tone generation to the MIDI channel. But, if the tone color is a melody tone color, rhythm tone color or user-specific tone color provided in the musical instrument, the routine goes to step S134.

In step S134, an empty MIDI channel is reserved for sounding the key-on event. The number of the reserved MIDI channel is set into the register TCH. Then, it is determined in step S135 whether or not rhythm tone color has been designated for the reserved MIDI channel (i.e., BSM=7FH). If the data in the register BSM is not 7FH, it means that melody-related tone color has been assigned, and the routine proceeds to step S136.

In step S136, by referring to the contents in the registers BSM (MCH), BSL (MCH) and PC (MCH), tone data for achieving the designated tone color are read out from the melody tone color list in accordance with the combination of the designated data. The tone data read out here includes the storage addresses of each tone color waveform, envelope information, vibrato information, effect information, tone volume balance information etc.

Next, in step S137, of parameter data contained in the readout vibrato information, data representing vibrato sensitivity is set into the register VSENS and data representing a minimum modulation depth is set into the register VMIN. In next step S138, the received vibrato depth data stored in the register VD (MCH) is modified on the basis of these parameter values, and the operation result is obtained as actual vibrato depth data VDE. Then in step S139, the vibrato depth data VDE is output to the tone synthesis circuit 6. After step S139, the routine proceeds to step S141.

If it is determined in step S135 that BSM is 7FH, it means that rhythm tone color has been assigned to the reserved MIDI channel. In this case, tone data are read out from the rhythm tone color list in accordance with the program change data and key code, and the routine proceeds to step S141.

The thus read-out tone data are fed to the tone synthesis circuit 6 in step S141, upon which the tone synthesis circuit starts generating tone. The tone synthesis circuit 6 also forms a vibrato modulation signal waveform using the vibrato depth data as a parameter, to thereby vibrato-modulate a tone to be generated.

If the determination in step S133 is that the event is not a key-on event KON, i.e., the event is a key-off event, the routine proceeds to step S142 to send a key-off signal to a corresponding tone generation channel. After that, the routine goes to step S143.

In steps S143 and S144, the processed data are cleared from the note buffer memory, and if other data are still left in the note buffer memory, the routine reverts to step S131 to continue processing in the above-mentioned manner.

The vibrato sensitivity data is such data for adjusting the degree (e.g., depth) of vibrato in accordance with the tone color of a tone to be vibrato-modulated. The minimum modulation depth data is such data for setting a minimum modulation depth of vibrato in accordance with the tone color. In the case of particular tone colors (for example, piano tone color) having no vibrato-like characteristic by nature, it will be appropriate to set the minimum modulation depth to "0". On the other hand, in the case of other tone colors inherently having vibrato-like characteristics, the minimum modulation depth may be of a suitable value other than "0", so that minimum vibrato can be effected even when the player has no intention to effect vibrato. The above-mentioned steps S137 and S138 in the embodiment process the vibrato depth data, but any other factor (e.g., frequency) than vibrato depth may be processed. Further, the type of modulation effect is not necessarily limited to vibrato as mentioned in the embodiment; the above-mentioned control is also advantageously applicable to other modulation such as attack pitch modulation, tremolo modulation or the like.

According to the present invention as described so far, because the volume level of an original sound is modified on the basis of the volume level set for an effect imparting circuit that is not provided in the instrument of the invention, effect impartment can be achieved with an appropriate effect balance without causing an undesirable decrease in volume. It should also be understood that the present invention may modify the volume level of any achievable effect rather than an original sound.

According to the present invention, it is possible to set not only sensitivity but also a minimum depth of modulation such as vibrato. Further, when initializing settings of an electronic musical instrument, it is possible not to initialize only selected information such as master tuning information. Moreover, it is possible to achieve natural tone color replacement by selecting only tone color, as replacement tone color, that corresponds to a predetermined variation and selecting the replacement tone color in consideration of a past replacement history.

What is claimed is:

1. An effect imparting system comprising:

effect imparting means for imparting an input original sound signal one or more specific kinds of effects forming a first effect group, the effects being imparted independently of each other;

synthesis means for synthesizing the original sound signal and signal having been imparted respective effects by said effect imparting means;

first setting means for setting a volume level of the original sound signal;

second setting means for setting respective volume levels of one or more effects that are selected from among said first effect group and from among a second effect group formed of one or more effects other than those of said first effect group;

determination means for determining which of said first and second effect groups each of said selected one or more effects having the volume level set by said second setting means belongs to;

modification means for modifying the volume level of the original sound signal set by said first setting means, in accordance with the volume level, set by said second setting means, of the effect determined by said determination means as belonging to said second effect group; and means for controlling respective levels of the signals to be synthesized by said synthesis means, in accordance with the volume level, set by said second setting means, of the effect determined as belonging to said first effect group set and the volume level modified by said modification means.

2. An effect imparting system as defined in claim 1 wherein at least said second setting means is provided outside a section that contains said effect imparting means and said synthesis means.

3. An effect imparting system as defined in claim 1 wherein said modification means increases the volume level of the original sound signal set by said first setting means, in accordance with the volume level, set by said second setting means, of the effect determined by said determination means as belonging to said second effect group.

4. An effect imparting device comprising:

effect imparting means for imparting an input original sound signal one or more specific kinds of effects forming a first effect group, the effect imparting means being provided for each of the effects to impart the effects independently of each other;

input means for inputting original sound level data for controlling a volume level of the original sound signal and individual effect level data for setting respective volume levels of the effects of said first effect group and a second effect group formed of one or more effects other than those of said first effect group;

determination means for determining which of said first and second effect groups the individual effect level data input through said input means correspond to;

means for, in accordance with the individual effect level data determined by said determination means as corresponding to the effect of said first effect group, controlling volume levels of effect-imparted signals output from said effect imparting means for imparting corresponding effects;

means for, in accordance with the individual effect level data determined as corresponding to the effect of said second effect group, modifying the original sound level data input through said input means and controlling the volume level of the original sound signal in accordance with the modified original sound level data; and synthesis means for synthesizing the effect-imparted signals and the original sound signal which have been controlled in respective volume levels.

5. An effect imparting device comprising:

effect imparting means for imparting an input original sound signal one or more specific kinds of effects forming a first effect group, the effects being imparted independently of each other;

synthesis means for synthesizing the original sound signal and signal having been imparted respective effects by said effect imparting means;

input means for inputting, from outside said device, original sound level data for controlling a volume level of the original sound signal and individual effect level data for setting respective volume levels of individual effects of said first effect group and a second effect group formed of one or more effects other than those of said first effect group;

determination means for determining which of said first and second effect groups the individual effect level data input through said input means correspond to;

modification means for modifying the original sound level data input through said input means, in accordance with the individual effect level data determined by said determination means as corresponding to the effect of said second effect group; and control means for controlling the levels of the signals to be synthesized by said synthesis means, in accordance with the individual effect level data determined by said determination means as corresponding to the effect of said second effect group and the original sound level modified by said modification means.

6. An effect imparting device as defined in FIG. 5 wherein said modification means modifies at least one of the original sound level data and the individual effect level data for the effects of said first effect group, in accordance with the individual effect level data determined by said determination means as corresponding to the effect of said second effect group, and wherein said control means controls the levels of the signals to be synthesized by said synthesis means in accordance with the modified individual effect level data and original sound level data.

7. A sound effect controlling method comprising the steps of:

transmitting a data set from a first musical instrument to a second musical instrument, said data set comprising original sound volume setting data for setting an original sound volume level and effect sound volume setting data for setting an effect-imparted sound volume level for one or more effects, wherein said second musical instrument may impart selected predetermined effects;

changing said original sound volume level by modifying said original sound volume setting data in accordance with said effect sound volume setting data, to thereby control a total volume balance, if an effect corresponding to the effect sound volume level setting data transmitted to said second musical instrument is not included in said predetermined effects of said second musical instrument; and controlling the effect-imparted sound volume level according to the transmitted effect sound volume setting data, controlling the original sound volume level according to the modified original sound volume setting data, and synthesizing the effect-imparted sound volume level and the modified original sound volume level for audible reproduction when said second musical instrument is to impart a selected effect to a given sound signal.

8. A sound control system comprising:

tone color designation means for designating a tone color for a sound to be generated;

modulation control parameter supplying means for supplying a modulation control parameter relating to a predetermined modulation effect, in correspondence to the tone color designated by said tone color designation means, said modulation control parameter having a value peculiar to the designated tone color, said modulation control parameter including a parameter for adjusting modulation sensitivity and a parameter for setting a minimum modulation depth;

input means for receiving modulation setting information relating to the predetermined modulation effect;

modification means for modifying the modulation setting information received through said input means, in accordance with the modulation control parameter supplied by said modulation control parameter supplying means; and means for imparting the predetermined modulation effect to said sound to be generated, in accordance with the modulation control parameter modified by said modification means wherein, said modification means outputs a value corresponding to the minimum modulation depth as the modulation setting information as long as the parameter for setting the minimum modulation depth is not zero, even if a value of the modulation setting information received through said input means is zero.

9. A sound control system as defined in claim 8 wherein said input means receives the modulation setting information provided from outside said system.

10. A sound control system comprising:

storage means for storing respective settings of various information relating to sound generation and control, wherein said information includes predetermined information;

modification means for modifying, as desired, the respective settings stored in said storage means;

initialization means for, in response to a user's instruction, collectively restoring the settings of the various information to predetermined initial states; and inhibition means for, when the various information is restored to the predetermined initial states by said initialization means, inhibiting said predetermined information from being restored.

11. A sound control system as defined in claim 10 wherein said modification means includes reception means for receiving, from outside said system, data for modifying the settings of the various information, and said modification means modifies the settings of the various information stored in said storage means, in accordance with the data received by said reception means.

12. A sound control system as defined in claim 10, wherein said predetermined information is master tuning information common to all pitches.

13. A sound control system comprising:

an independent musical instrument having a common tone color group providing tone colors common to a different musical instrument and a unique tone color group providing tone colors which are peculiar to said independent musical instrument, said common tone color group including at least one tone color group;

said independent musical instrument comprising:

reception means for receiving, from outside said system, information specifying a designated tone color including a combination of a tone color group and an individual tone color contained in the tone color group;

replacement means for replacing the designated tone color with any tone color of the common tone color group as long as the designated tone color belongs to the common tone color group, if said designated one color received by said reception means is not available in the independent musical instrument.

14. A sound control system as defined in claim 13 wherein, if the tone color of the tone color group designated by the received information is achievable by said independent musical instrument, said replacement means stores the received information into said storage means, and if the tone color of the tone color group designated by the information later received by said reception means is not achievable by said independent musical instrument, said replacement means refers to stored contents in said storage means and thereby replaces the designated tone color with a tone color that has been confirmed as achievable in the past.

15. A media for use in an electronic musical instrument, said media containing program code executable by the electronic musical instrument for performing the steps of:

transmitting a data set from a first musical instrument to a second musical instrument, said data set comprising original sound volume setting data for setting an original sound volume level and effect sound volume setting data for setting an effect-imparted sound volume level for one or more effects, wherein said second musical instrument may impart selected predetermined effects;

increasing said original sound volume level by modifying said original sound volume setting data in accordance with said effect sound volume setting data, to thereby control a total volume balance, if an effect corresponding to the effect sound volume level setting data transmitted to said second musical instrument is not included in said predetermined effects of said second musical instrument; and controlling the effect-imparted sound volume level according to the transmitted effect sound volume setting data, controlling the original sound volume level according to the modified original sound volume setting data, and synthesizing the effect-imparted sound volume level and the modified original sound volume level for audible reproduction when said second musical instrument is to impart a selected effect to a given sound signal.

* * * * *